(12) United States Patent
Shetty et al.

(10) Patent No.: US 12,079,577 B2
(45) Date of Patent: Sep. 3, 2024

(54) INTELLIGENT CREATION OF CUSTOMIZED RESPONSES TO CUSTOMER FEEDBACK

(71) Applicant: VMware, Inc., Palo Alto, CA (US)

(72) Inventors: Rohit Pradeep Shetty, Bangalore (IN); Erich Stuntebeck, Johns Creek, GA (US)

(73) Assignee: VMware LLC, Palo Alto, CA (US)

( * ) Notice: Subject to any disclaimer, the term of this patent is extended or adjusted under 35 U.S.C. 154(b) by 272 days.

(21) Appl. No.: 17/499,617

(22) Filed: Oct. 12, 2021

(65) Prior Publication Data

US 2023/0110127 A1    Apr. 13, 2023

(51) Int. Cl.
| | |
|---|---|
| *G06F 40/30* | (2020.01) |
| *G06F 8/658* | (2018.01) |
| *G06F 40/205* | (2020.01) |
| *G06F 40/295* | (2020.01) |
| *G06Q 30/0203* | (2023.01) |
| *H04L 51/046* | (2022.01) |

(52) U.S. Cl.
CPC ............ *G06F 40/295* (2020.01); *G06F 8/658* (2018.02); *G06F 40/205* (2020.01); *G06Q 30/0203* (2013.01); *H04L 51/046* (2013.01)

(58) Field of Classification Search
CPC ...... G06F 40/30; G06F 40/205; G06F 40/295; G06F 8/658; G06F 16/3326; G06F 16/35; G06F 8/65; G06N 20/00; G06N 3/02; G06Q 30/0203; G06Q 30/0631; G06Q 30/0282; H04L 51/02; H04L 51/046
See application file for complete search history.

(56) References Cited

U.S. PATENT DOCUMENTS

| | | | | |
|---|---|---|---|---|
| 6,151,643 | A  * | 11/2000 | Cheng ....................... | G06F 8/61 |
| | | | | 709/200 |
| 7,483,846 | B1 * | 1/2009 | Kumar ............... | G06Q 30/0641 |
| | | | | 705/7.29 |
| 10,185,982 | B1 * | 1/2019 | Kane-Parry ........ | G06Q 30/0603 |
| 10,970,731 | B1 * | 4/2021 | Latifi ................. | G06Q 30/0236 |
| 11,004,128 | B1 * | 5/2021 | Mishra ............... | G06Q 30/0631 |
| 11,132,733 | B2 * | 9/2021 | Srinivasan .......... | G06F 16/9535 |
| 11,301,540 | B1 * | 4/2022 | Boteanu ................ | G06F 40/279 |
| 2002/0004749 | A1 * | 1/2002 | Froseth .................. | G06Q 50/00 |
| | | | | 705/16 |
| 2002/0161664 | A1 * | 10/2002 | Shaya ................ | G06Q 30/0282 |
| | | | | 705/26.7 |

(Continued)

*Primary Examiner* — Jakieda R Jackson
(74) *Attorney, Agent, or Firm* — Kim & Stewart LLP (57) ABSTRACT

Systems and methods are described for creating a customized response to user feedback. In an example, a feedback system can receive user feedback about a product. The feedback system can parse the user feedback to extract keywords and assign categories to the keywords. The feedback system can also receive update information related to the product. The feedback system can parse the product update information in a similar manner to extract keywords and assign them to categories. The feedback system can compare the parsed user feedback and the parsed product update information and identify any matches that indicate that the product update addresses something mentioned in the user feedback. The feedback system can create a custom notification that highlights the portion of the product update information that matched to the user feedback.

20 Claims, 4 Drawing Sheets

(56) References Cited

U.S. PATENT DOCUMENTS

| | | | | |
|---|---|---|---|---|
| 2003/0208399 | A1* | 11/2003 | Basak | G06Q 30/02 |
| | | | | 705/14.67 |
| 2004/0143513 | A1* | 7/2004 | Aleles | G06Q 30/02 |
| | | | | 705/26.1 |
| 2011/0047013 | A1* | 2/2011 | Mckenzie, III | G06Q 10/10 |
| | | | | 705/14.4 |
| 2012/0239481 | A1* | 9/2012 | Yankovich | G06Q 30/06 |
| | | | | 707/769 |
| 2016/0171588 | A1* | 6/2016 | Linden | G06F 3/0482 |
| | | | | 705/26.7 |
| 2016/0217522 | A1* | 7/2016 | Jnagal | G06Q 30/0627 |
| 2017/0255986 | A1* | 9/2017 | Herbst | G06Q 30/0609 |
| 2017/0287044 | A1* | 10/2017 | Rose | G06Q 30/0631 |
| 2017/0315701 | A1* | 11/2017 | Rolih | G06F 3/04883 |
| 2017/0330264 | A1* | 11/2017 | Youssef | G06F 16/24578 |
| 2018/0374567 | A1* | 12/2018 | Toumazou | G16H 20/60 |
| 2020/0226632 | A1* | 7/2020 | Khan | G06Q 30/0631 |
| 2020/0234807 | A1* | 7/2020 | Toumazou | G16H 10/65 |
| 2020/0293024 | A1* | 9/2020 | Pail | G05B 19/4097 |
| 2020/0311214 | A1* | 10/2020 | Chatterjee | G06N 20/00 |
| 2020/0319784 | A1* | 10/2020 | Sinclair | G06T 11/001 |
| 2020/0334737 | A1* | 10/2020 | Miller | G06Q 30/0639 |
| 2021/0304263 | A1* | 9/2021 | Guruprasad | G06Q 50/02 |
| 2022/0366340 | A1* | 11/2022 | Chen | G06Q 30/0269 |

* cited by examiner

INTELLIGENT CREATION OF CUSTOMIZED RESPONSES TO CUSTOMER FEEDBACK

BACKGROUND

Most applications collect feedback from their customers on a regular basis. This could be in the form of comments in the help section, pop-up surveys, telephonic surveys, tickets, and so on. One way that customer feedback is handled is by parsing the feedback manually by a corresponding department. Another way is by automatically categorizing the feedback using machine learning ("ML") algorithms. Respective project managers then analyze these comments to derive any insights on what is missing in their products and how they can increase customer satisfaction. However, that is where the entire process rolls to a stop. At most, the feedback might be incorporated into the product. However, there is no further interaction with the customer indicating that they are being heard except in exception circumstances, such as with a very important customer.

Most customers therefore usually consider these feedback surveys and comments a waste of time because they think no one actually reviews them. The general feeling among many customers is that big corporations do not listen to them. The corporations do everything at their pace and never give customers any kind of personalized attention. Over time, this can lead to customers losing faith in the feedback loop of the product and might even cause them to switch over to the competition. Even when a user provides feedback that later gets incorporated into a product, the user is never notified. The user therefore remains unaware that the feedback was helpful.

As a result, a need exists for informing customers when their feedback is incorporated into a product.

SUMMARY

Examples described herein include systems and methods for creating a customized response to user feedback. In an example, a feedback system can receive user feedback about a product. The user feedback can include feedback information from a user about a product, such as what the user likes or does not like about the product, recommendations for features or bug fixes, and the like. The feedback system can parse user feedback to extract keywords and assign them to categories. In one example, this can be performed by applying an ML algorithm that can be retrained based on input indicating correct and incorrect keyword extractions and categorizations. In another example, the ML algorithm can parse the user feedback using a Natural Language Processing ("NLP") technique, such as classification predictive modeling, keyword extraction, and named entity recognition. The user feedback can be stored according to feature and product, in an example.

In an example, the feedback system can receive update information about the product, such as release notes or a Plan of Record ("POR") for the product. The feedback system can parse the product update information as well to extract keywords and assign them to categories. The product update information can also be parsed by applying an ML algorithm. In one example, the same ML algorithm can be applied to both the user feedback and product update information.

In an example, the feedback system can compare the parsed user feedback and the parsed product update information to identify any portions of the product information that relate to something described in the user feedback. In other words, the feedback system can identify anything in the product update that addresses feedback provided by the user. In one example, the comparison can be performed by applying a word embedding algorithm to capture the contextual meanings of the keywords. The feedback system can semantically match portions of the product update information to portions of the stored user feedback by identifying words and phrases with similar contextual meanings.

In an example, the feedback system can create a custom notification that highlights the portion of the product update information that matched to the user feedback. The custom notification can be created using any communication medium that can inform the user of the match, such as an email, instant message, or push notification. The custom notification can be sent to the user so that the user knows that the feedback was applied to the product. For example, when a new product release updates multiple features of an application, a user that previously submitted feedback on one of those features can receive an email thanking them for the prior feedback on the feature and noting that feature is now updated.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are described for creating a customized response to user feedback. In an example, a feedback system can receive user feedback about a product. The feedback system can parse the user feedback to extract keywords and assign categories to the keywords. The system can store a record of the parsed user feedback, associating the user to the categories. The feedback system can also receive update information related to the product. The feedback system can parse the product update information in a similar manner to extract keywords and assign them to categories. The feedback system can compare the parsed user feedback and the parsed product update information and identify any matches that indicate that the product update addresses something mentioned in the user feedback.

The feedback system can create a custom notification for the user that highlights the portion of the product update information that matched to the user feedback.

Figure 1:
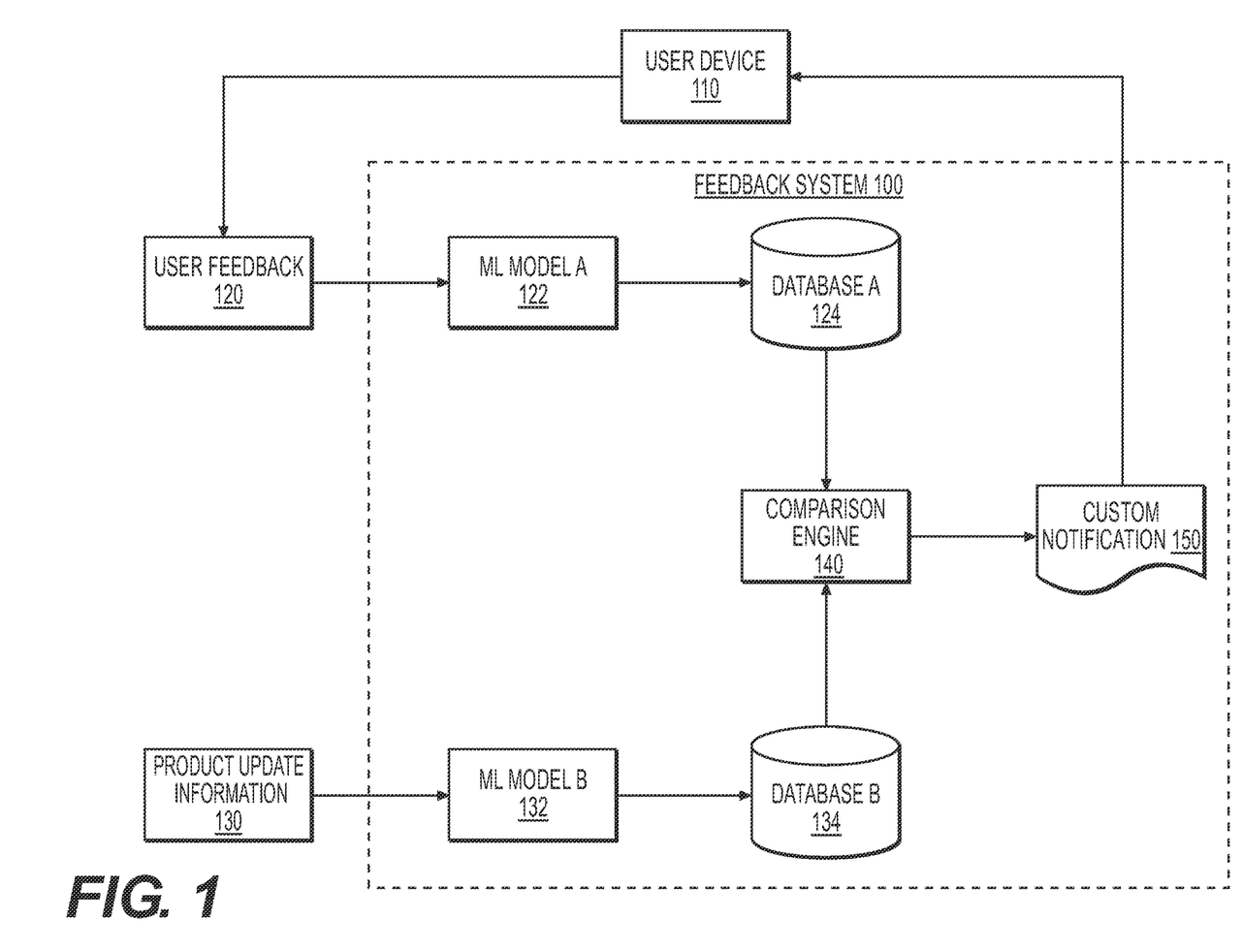
FIG. 1 is an illustration of an example system for creating a customized response to user feedback.

FIG. 1 is an illustration of a system for creating a customized response to user feedback. A user device 110 can execute an application that allows users to provide user feedback 120. The user device 110 can be one or more processor-based devices, such as a personal computer, tablet, or cell phone. The user feedback 120 can include information from a user about a product. As some examples, the user can provide comments in a help section or online forum, complete a survey, submit a help ticket, and so on. The product can be any product that a user can provide feedback for. For example, the product can be a software application or a computing device like the user device 110. In one example, the user feedback 120 can be typed, recorded, or provided by the user in another manner, such as with a phone call with a support specialist.

In an example, the user feedback 120 can be sent to a feedback system 100. The feedback system 100 can be a system that processes the feedback 120 and generates a custom notification 150 for the user when changes are made that are relevant to the product and the user feedback 120. The feedback system 100 can include a computing device or a group of devices that work together to perform the methods described herein. For example, the feedback system 100 can include a server or a group of servers, including multiple servers implemented virtually across multiple computing platforms. In another example, the feedback system 100 can include one or more databases, such as the database A 124 and the database B 134. In another example, the feedback system 100 can be a cloud-based system. Actions described herein as being performed by the feedback system 100 or any of its components can be performed by a computing device within the feedback system 100. Similarly, references to ML models performing actions can refer to a computing device that hosts the ML model performing the action or applying the ML model to perform the action.

In an example, the feedback system 100 can include an ML model A 122. The ML model A 122, as well as the ML model B 132 described later herein, can be trained to parse data using NLP techniques, such as classification predictive modeling, keyword extraction, and NER. The ML models A 122, B 132 can also be trained to recognize sentiments, such as where the user feedback 120 is positive or negative. The ML model A 122 can detect keywords in the user feedback 120 to classify the feedback 120 relative to a product feature. In one example, the product is also determined by the ML model A 122. In other examples, the user indicates the product explicitly, such as on a graphical user interface ("GUI"), when providing the product feedback 120.

In an example, the feedback system 100 can store the parsed user feedback 120 in the database A 124. The stored feedback 120 can include a product identifier, a feature identifier, and a user identifier, in an example. This can allow for later retrieval when a relevant product feature is updated. Alternatively, the parsed feedback 120 can be referenced to determine what feedback 120 relates to which product updates.

The feedback system 100 can apply the ML model B 132 to product update information 130 to parse the product update information 130. The product update information 130 can include update information about the product that can related to the stored user feedback 120. Some examples of the product update information 130 can include release notes or a POR associated with the product. Like the ML model A 122 described above, the ML model B 132 can parse the product update information 130 using one or more NLP techniques. The feedback system 100 can save the parsed product update information in the database B 134.

The ML algorithms A 122 and B 132 can be the same or different ML algorithms. In one example, the ML algorithms A 122 and B 132 can be trained using the same data so that they parse data in the same manner, thus creating the most comparable results between the user feedback 120 and the product update information 130. The parsing can occur on the same or different computing devices in the feedback system 100, depending on the example. Also depending on the example, the parsed results can be stored on the same or different databases. For example, the databases A 124 and B 134 can be the same storage device or different storage devices.

In an example, the feedback system 100 can include a comparison engine 140. The comparison engine 140 can be one or more processes that execute on a server of the feedback system 100. The comparison engine 140 can compare parsed user feedback 120 and parsed product update information 130 to determine whether any content in the user feedback 120 matches to the product update information 130. In other words, the comparison engine 140 can identify any planned updates, features, or fixes to the product that relate directly something requested or mentioned in the user feedback 120. Details on how the comparison engine 140 matches the parsed user feedback and the parsed product update information are described in detail later herein.

In an example, the feedback system 100 can create a custom notification 150 for the user when a match is found. In one example, the custom notification 150 can indicate how the user feedback 120 is being implemented into the product. The custom notification 150 can created using any communication medium that can inform the user of the match. For example, the custom notification 150 can be an email, instant message, or push notification. In one example, the custom notification can be sent to the user device 110 of the user. In another example, the feedback system 100 can send the notification to project manager or similar user, and the project manager can modify the custom notification 150 before sending it to the user. For example, the project manager can review the custom notification 150 to ensure that the product update information 130 does address the feedback provided by the user in the user feedback 120. In one example where the project manager determines that the product update information 130 does address the user feedback 120, the project manager can cancel all or a portion of the custom notification 150. In another example, the project manager can modify the custom notification 150 to personalize it for the user or provide additional information, such as a timeframe for the next release version. The custom notification can also be part of a communication that invites the user to download the new version of the application.

Figure 2:
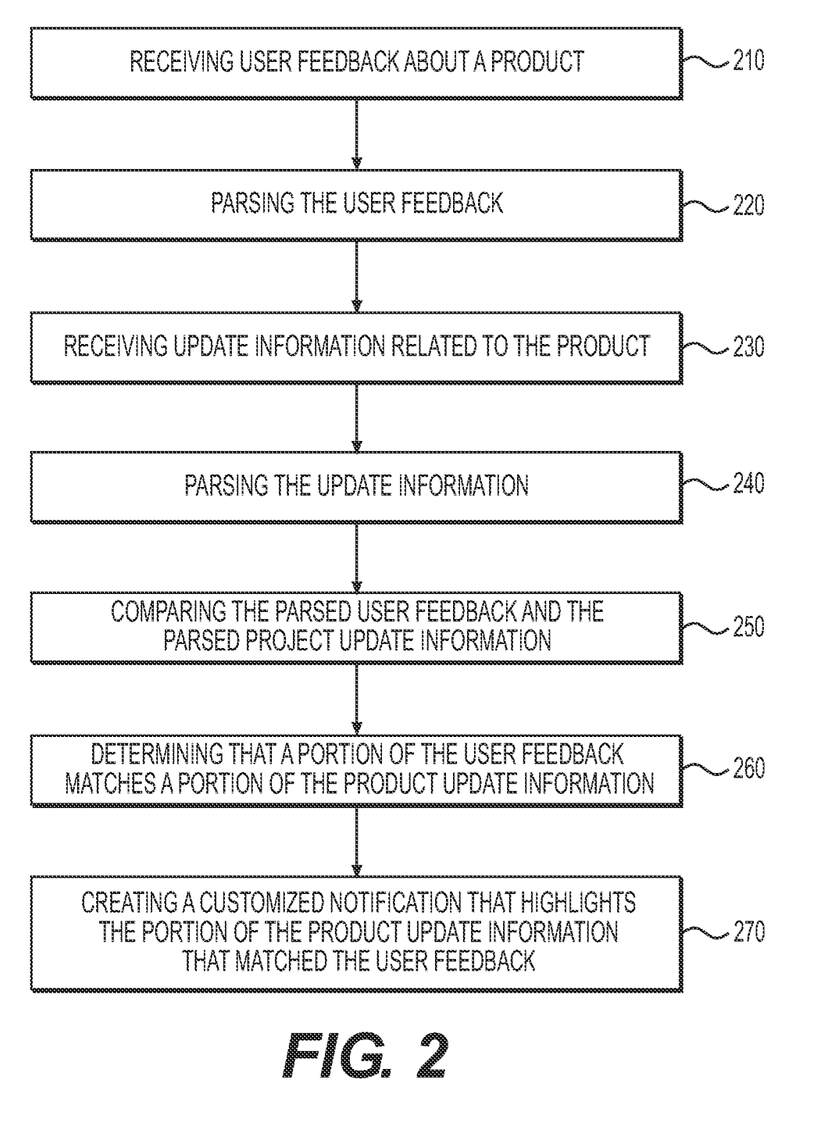
FIG. 2 is a flowchart of an example method for creating a customized response to user feedback.

FIG. 2 is a flowchart of an example method for creating a customized response to user feedback. At stage 210, the feedback system 100 can receive user feedback 120 about a product. The user feedback 120 can include textual or audio feedback information from a user about a product, such as what the user likes or does not like about the product, recommended features or bug fixes, and the like. In an example, the user can provide the user feedback 120 from the user device 110 using a feedback tool associated with the product, such as a help section, an online forum, a survey, a help ticket, and the like.

At stage 220, the feedback system 100 can parse the user feedback 120. In one example, the feedback system 100 can parse the user feedback 120 by applying the ML model A 122 to the user feedback 120. In an example, the ML model A 122 can parse the user feedback 120 by implementing one or more NLP techniques, such as classification predictive modeling, keyword extraction, and NER. For example, the ML model A 122 can identify keywords and phrases in the user feedback 120 and categorize them. In one example the ML model 122 can categorize the keywords by applying tags to them. In another example, the ML model A 122 can also recognize sentiments, such as whether the user feedback 120 is positive or negative.

The following is an example user feedback 120 for a product that is a console for a Unified Endpoint Management ("UEM") system: "I am not satisfied with the UI refresh options in the UEM Console. Refresh is painful and also loses any work in progress. Also, search functionality is complicated." This example is used throughout and is hereinafter referred to as the "UEM Console example."

In an example, when parsing the example user feedback 120 above, the ML model A 122 can extract "UEM Console" and apply a tag for a product name category. The ML model A 122 can identify product features and apply a feature tag corresponding to the product feature and secondary tags for secondary categories based on the feature category. For example, "UI refresh options" can be tagged with a feature tag related to a user interface ("UI") feature and a secondary tag related to options or functionality. In an example, the ML model A 122 can also apply sentiment tags. For example, "I am not satisfied" and "refresh is painful" can be tagged as negative sentiments regarding the UI feature. The ML model A 122 can also identify the phrase "loses any work in progress" as a specific issue with the "UI refresh options" and apply a corresponding secondary tag. Additionally, the ML model A 122 can extract "search functionality is complicated" and identify the phrase as being related to a second feature. The ML model A 122 can apply a feature tag corresponding to a search feature, apply a secondary tag for "is complicated" as a specific issue, and apply a negative sentiment tag based on the determined tone.

The parsed feedback, such as the generated tags, can be saved in a database in association with the user, product, and product feature in an example. This can allow the feedback system 100 to correlate the user feedback 120 to eventual changes made to the product.

At stage 230, the feedback system 100 can receive product update information 130 about the product. The product update information 130 can include update information about the product, such as release notes or a POR. In an example, the product update information 130 can be provided by a project manager, or other type of user that manages releases of the product. The following is an example product update information 130 for the UEM Console example:

"We are pleased to announce version 14.1 of UEM Console consisting of the following improvements:
  Speed increases of 6%.
  Memory footprint reduction of 12%.
  Fixing of iterative threading issue.
  UI refresh option fixed.
  Fix of memory overrun.
  Improvement of search functionality.
  Multi-user operation mode."

At stage 240, the feedback system 100 can parse the product update information 130. Like with the ML model A 122 described above, the ML model B 132 can parse the product update information 130 by implementing one or more NLP techniques. For example, the ML model B 132 can identify keywords and phrases in the product update information 130 and categorize them. In one example the ML model 122 can apply tags to the keywords and phrases to categorize them.

In an example, the model B 132 can identify "We are pleased to announce version 14.1 of UEM Console consisting of the following improvements" as background information and apply a corresponding tag. The ML model B 132 can extract "UEM Console" and apply a tag for the product name and apply a release version tag to "14.1." In an example, update items in the product update information 130 can be linked to the product name and release version tags so that they are properly compared to user feedback 120.

In an example, when parsing the example product update information 130 above, the ML model B 132 can apply a feature tag and secondary tags to the update items, similar to the user feedback 120 above. In an example, the feature tag can identify the feature each update item corresponds to and the secondary tag can indicate the type of change being performed on the feature. For example, "speed increases of 6%" can be tagged with a feature tag related the product's speed and with a secondary tag related to performance rate. "Memory footprint reduction of 12%" illustrates an example where an update item can be tagged with two feature tags: a first tag for the feature and a second tag for a subcategory of the feature. For example, "memory footprint reduction of 12%" can be tagged with a feature tag corresponding to memory and a subcategory feature tag corresponding to the memory's footprint. "Memory footprint reduction of 12%" can also be tagged with a secondary tag related to a reduction rate. "Fixing iterative threading issue" can be tagged with a feature tag corresponding to iterative threading and a secondary tag indicating a fix as the change type. "UI refreshed option fixed" can be tagged with two features tags: one feature tag for a UI feature and a subcategory feature tag for a refresh option. "UI refresh option fixed" can also be tagged with a secondary tag indicating a fix as the change type. "Fix of memory overrun" can be tagged with the same memory tag as "memory footprint reduction of 12%" because they both relate to memory usage of the product. In one example, the memory overrun can include an additional tag indicating an issue with the feature, which in this case would relate to the overrun of the memory. "Fix of memory overrun" can also include a tag indicating a fix as the change type. "Improvement of search functionality" can include a feature tag related to a search function and a secondary tag indicating an improvement as the change type. "Multi-user operation mode" can be an example of a new feature introduced into the product. In one example, the ML model B 132 can create a new tag when it identifies a new feature category in the product. In another example, the ML model B 132 can analyze previous user feedbacks 120 provided to determine whether a user previously suggested introducing the new feature. If such a suggestion can be found, the ML model B 132 can tag the new feature with a tag created for the previous user feedback 120. In one example, this can be used to notify the user of the previous user feedback 120 that the new feature has been introduced.

Update tags can also be modified by an administrator. For example, the administrator can add tags and remove tags using a GUI. This can allow the administrator to control which features are treated as updated for a product release and, consequently, the notification subject matter that goes out to users who have given prior feedback.

At stage 250, the feedback system 100 can compare the parsed customer feedback and the parsed product update information. In an example, this stage can be performed by the comparison engine 140. In one example, the comparison engine 140 can perform the comparison by applying a word embedding algorithm that presents individual words as real-valued vectors in a predefined vector space. Each parsed word or phrase can be mapped to a vector in a way that allows words used in similar ways to have similar representations. This can help capture the real meaning of a word or phrase based on context. Some example word embedding algorithms include WORD2VEC, GLOVE, and TF-IDF. In one example, the word embedding algorithm can be an ML algorithm that can be retrained based on feedback indicating whether the comparison engine 140 properly matched user feedback 120 and the product update information 130.

The comparison can determine whether any content in the user feedback 120 matches to the product update information 130. For example, the comparison engine 140 can apply a word embedding algorithm to the parsed user feedback and parsed product update information and determine whether any keywords have similar vector representations. In one example, the comparison engine 140 can compare words and phrases from both the user feedback 120 and the product update information 130 that correspond to the same feature category. This can include determining whether any applicable subcategories match as well. For example, user feedback 120 about the memory footprint in the UEM Console example may not match to the update item regarding the memory overrun, despite both being related to memory.

At stage 260, the feedback system 100 can determine that a portion of the user feedback 120 matches a portion of the update information 130. In other words, the feedback system 100 can determine that the product update addresses feedback provided by the user. For example, the feedback system 100 can match extracted keywords from the user feedback 120 to extracted keywords from the product update information 130. In one example, the feedback system 100 can match keywords only when the keywords have been assigned to the same category, such as by identifying matching keywords with the same tags. In one example, the feedback system 100 can perform a semantic match based on the word embedding techniques. For example, the feedback system 100 can perform a semantic match where similarly categorized keywords are matched based on their contextual meanings.

Continuing the UEM Console example, the comparison engine 140 can determine that the user feedback 120 and product update information 130 relate to the same product. This can include matching product identifiers or names. The comparison engine 140 can then compare the keywords to determine whether any of the update items relates to the feedback provided by the user. For example, the comparison engine 140 can compare the user's comments about the "UI refresh options" to the update item that reads "UI refresh option fixed" based on both being assigned, or tagged, to the same feature category. A semantic comparison can determine that the update item addresses the user feedback 120 about the UI refresh options. The comparison engine 140 can match the user's comments about the search functionality being complicated to the update item that reads "improvement of search functionality" in the same manner.

In an example, the comparison engine 140 may not match the user feedback 120 and product update information 130 where they are both assigned to the same feature category, but do not match semantically. For example, if a user provides feedback that reads "the product uses too much memory," this can map to the update item "memory footprint reduction of 12%," but not "fix of memory overrun." Although the feedback and "fix of memory overrun" both relate to memory, a fix of memory overrun does not address the user's concern about the product using too much memory. However, the update item "memory footprint reduction of 12%" relates to memory and addresses the product's memory usage, and would therefore be a match.

At stage 270, the feedback system 100 can create a custom notification 150 that highlights portions of the product update information 130 that matched to customer feedback 120. The custom notification 150 can be created using any communication medium that can inform the user of the match, such as an email, instant message, or push notification. In an example, the custom notification 150 can include all the update options, but highlight text relating to the matched update items, such as with highlighting, bold, italics, underline, or some combination of these. In one example, the custom notification 150 can list only the matched update items. In another example, the custom notification can list the matched update items in a section at the top of the custom notification 150 and the other update items in another section. In still another example, the custom notification 150 can list only the matched update items and include a hyperlink, such as a Uniform Resource Locator ("URL") hyperlink, that directs to a web page that lists all the product update information 130.

An example custom notification 150 of the UEM Console is below that highlights the matches described above:

"We are pleased to announce version 14.1 of UEM Console consisting of the following improvements which were previously referenced by you in your interactions with the product:

UI refresh option fixed.

Improvement of search functionality.

Also, other major improvements in this new version can be found here:

http://product.com/release/notes/uem/14.1"

In an example, the feedback system 100 can track custom notifications 150 sent to a user. This can include tracking which items in the user feedback 120 matched with product update information 130. For example, the feedback system 100 can flag such items indicating that they have already matched, and the feedback system 100 can ignore those items when performing a comparison. As an example, in the UEM Console example the user can provide feedback expressing frustration with the UI refresh options, and subsequently the product update information 130 can indicate that the UI refresh option was fixed. After matching these items and notifying the user, the feedback 110 can flag the items with respect to the user. If a subsequent update includes another UI refresh options fix, the feedback system 100 can see the flag and ignore the user feedback about the UI refresh options so that the user is not notified again. However, if, after the product is updated with the UI refresh options fix, the user provides more feedback about the UI refresh options, the additional feedback can then trigger a comparison when the UI refresh options is addressed in a subsequent update. To do this, the system can track which instances of user feedback have already been responded to with notifications.

In an example, the feedback system 100 can apply the flags individual items identified in the parsed data. For example, the user can provide feedback about multiple features of the product at once. The checklist system 100 can parse the user feedback 120 and save an entry for each issue identified. Each entry can be treated individually by the checklist system 100, so flagging one entry will not affect the other. As an example, in the UEM console example the user provides feedback about the UI refresh options and the search functionality. When parsing the user feedback 120, the feedback system 100 can save each as a separate entry. When a fix to the UI refresh options is released, the user can be notified and the feedback system 100 can flag the UI refresh options entry, but not the search functionality entry. The checklist system 100 can continue to compare the search functionality entry to product update information 130 for future product updates until an update addresses the search functionality.

Figure 3:
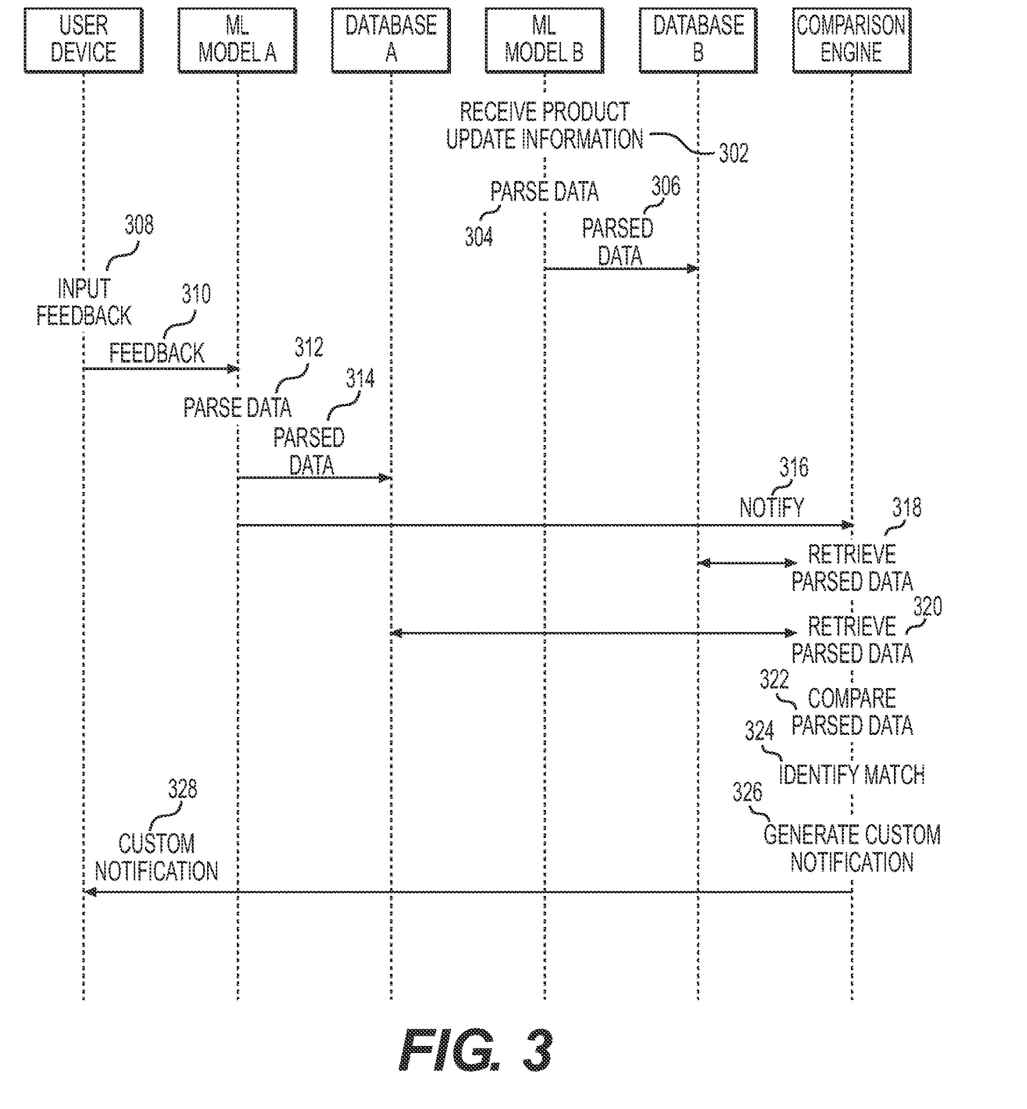
FIG. 3 is a sequence diagram of an example method for creating a customized response to user feedback.

FIG. 3 is a sequence diagram of an example method for creating a customized response to user feedback when receiving the user feedback 120 triggers a comparison of the user feedback 120 and the product update information 130. Triggering a comparison based on the reception of the user feedback 120 can be particularly useful in instances where the user provides feedback in the window between when the product update information is created and when the product update occurs. This can allow the system to give the user a preview of updates to features for which the user provided feedback. For example, the feedback system 100 can trigger a comparison of the user feedback 120 and product update information 130 upon reception of the user feedback 120 so that the user can be notified of any items from the user feedback 120 that are being addressed in the upcoming product update.

As an example, the feedback system 100 can receive the product update information 130 before the user feedback 120. The product update information 130 can indicate an upcoming update, rather than one that is already available. The user feedback 120 can include a complaint about the UI refresh options described in the UEM Console example, and the product update information 130 can identify the UI refresh options as a feature being updated in the upcoming update. The feedback system 100 can execute a first comparison when the product update information 130 is received, and the first comparison can compare the product update information 130 to existing user feedback stored in the database A 124.

The feedback system 100 can execute a second comparison when the user feedback 120 is received, and the second comparison can compare the user feedback 120 to the product update information 130 for the upcoming product update. In an example, the feedback system 100 can perform the stages described below for the second comparison. In some examples, a third comparison can occur when the product update information is again modified to reflect that the product update is available. However, by triggering the second comparison based on receiving the user feedback 120, the system can notify the user that an item that the user gave feedback about is being addressed in an upcoming update. This can help keep the user engaged with the product and looking forward to the upcoming release.

At stage 302, ML model B 132 can receive the product update information 130. The product update information 130 can include update information about the product, such as release notes or a POR. In an example, the product update information 130 can be provided by a project manager, or other type of user that manages releases of the product.

At stage 304, the ML model B 132 can parse the product update information 130. In an example, the ML model B 132 can parse the product update information 130 by implementing one or more NLP techniques. For example, the ML model B 132 can identify keywords and phrases in the product update information 130 and categorize them. In one example the ML model 122 can apply tags to the keywords and phrases to categorize them.

At stage 306, the parsed product update information can be saved to the database B 134. In an example, the parsed product update information can be accessed by the comparison engine 140 as needed. For example, the comparison engine 140 can access the parsed product update information after a user provides feedback about the product.

At stage 308, the user device 110 can receive user feedback 120. The user feedback 120 can include feedback information from a user about the product, such as what the user likes or does not like about the product, recommend features or bug fixes, and the like. In an example, the user can provide the user feedback 120 from the user device 110 using a feedback tool associated with the product, such as a help section, an online forum, a survey, a help ticket, and the like.

At stage 310, the user device 110 can send the user feedback 120 to the ML model A 122. This can refer to the user device 110 sending the user feedback 120 to a computing device in the feedback system 100 that hosts the ML model A 122. At stage 312, the ML model A 122 can parse the user feedback 120. In an example, the ML model A 122 can parse the user feedback 120 by implementing one or more NLP techniques, such as classification predictive modeling, keyword extraction, and NER. For example, the ML model A 122 can identify keywords and phrases in the user feedback 120 and categorize them. In one example the ML model 122 can categorize the keywords by applying tags to them. In another example, the ML model A 122 can also recognize sentiments, such as whether the user feedback 120 is positive or negative. At stage 314, the parsed user feedback can be saved to the database A 124. For example, the feedback system 100 can save the parsed user feedback to the database A 124.

At stage 316, the comparison engine 140 can be notified about the parsed user feedback 120. For example, the computing device that applies the ML model A 122 to the user feedback 120 can send the parsed results to the database A 124 and also notify the comparison engine 140. In another example, the database A 124 can notify the comparison engine 140 when parsed feedback results are saved.

In this example, the parsed user feedback being saved to the database A 124 can trigger the comparison engine 140 to initiate a comparison of the user feedback 120 to the existing product update information 130 to determine whether the upcoming product update addresses anything in the user feedback 120. In one example, the feedback system 100 can compare timestamps to determine whether the user feedback 120 should be compared to the product update information 130. For example, the feedback system 100 can log a first timestamp corresponding to when it receives the product update information 130, a second timestamps corresponding to the product update release date, a third timestamp corresponding to when it receives the user feedback 120. The feedback system 100 can initiate the comparison if the third timestamp is between the first and second timestamps. In other words, the feedback system 100 can initiate the comparison if the user feedback 120 was received after the product update information 130 was received, but before the product update is released. In these examples, the feedback system 100 can restrict the comparison to the upcoming product release so that the user feedback 120 is not compared to product update information for updates that are already available, which the user feedback 120 presumably is in response to. In one example, the product update information 130 can be further updated when the release is available, resulting in another comparison as shown later in FIG. 4 and potentially resulting in different notification messaging to the user based on the release availability.

At stage 318, the comparison engine 140 can retrieve the parsed user feedback from the database A 124. In one example, the comparison engine 140 can query the database A 124 for the parsed user feedback. In another example, the comparison engine 140 can have read access to the database A 124, and the comparison engine 140 can read the parsed data without downloading the data to another device. At stage 320, the comparison engine 140 can retrieve the parsed product update information from the database A 124. This can occur in a manner similar to the parsed user feedback described above.

At stage 322, the comparison engine 140 can compare the parsed user feedback to the parsed product update information. In one example, the comparison engine 140 can apply a word embedding algorithm to map keywords from the parsed user feedback and parsed product update information to a real-valued vector that indicates the meanings of the keywords. The comparison engine 140 can map the vectors of the keywords from the parsed user feedback to the keywords from the parsed product update information. In one example, the comparison engine 140 can compare keywords and phrases that are assigned to a like category, such as the same product feature.

At stage 324, the comparison engine 140 can identify a match from the comparison. For example, the feedback system 100 can match extracted keywords from the user feedback 120 to extracted keywords from the product update information 130. In one example, the feedback system 100 can match keywords only when the keywords have been assigned to the same category. In another example, the feedback system 100 can semantically match keywords based on their contextual meaning using the word embedding techniques.

At stage 326, the comparison engine 140 can generate a custom notification 150. In an example, the custom notification 150 can highlight portions of the product update information 130 that matched to customer feedback 120. The custom notification 150 can be created using any communication medium that can inform the user of the match, such as an email, instant message, or push notification. The custom notification 150 can be created in any format that draws a user's attention to the portions of the product update information 130 that matched to the user feedback 120.

At stage 328, the comparison engine 140 can send the custom notification 150 to the user device 110. This can allow the user to see that the user's feedback is being implemented into the product. In one example, the comparison engine 140 can send the custom notification 150 to an intermediary user, such as a product manager. The product manager can review the custom notification 150 for accuracy and modify the custom notification 150 if necessary. In one example where the comparison engine incorrectly matched a portion of the user feedback 120 to a portion of the product update information 130, the product manager can indicate the incorrect match. In one example, the product manager can also provide information indicating why the match is incorrect. The input from the product manager can be used to retrain the ML models A 122, B 132, and the comparison engine 140 so that a similar incorrect match can be avoided in the future. In an example, after reviewing the custom notification 150 and making any necessary changes, the product manager can send the custom notification to the user device 110.

Figure 4:
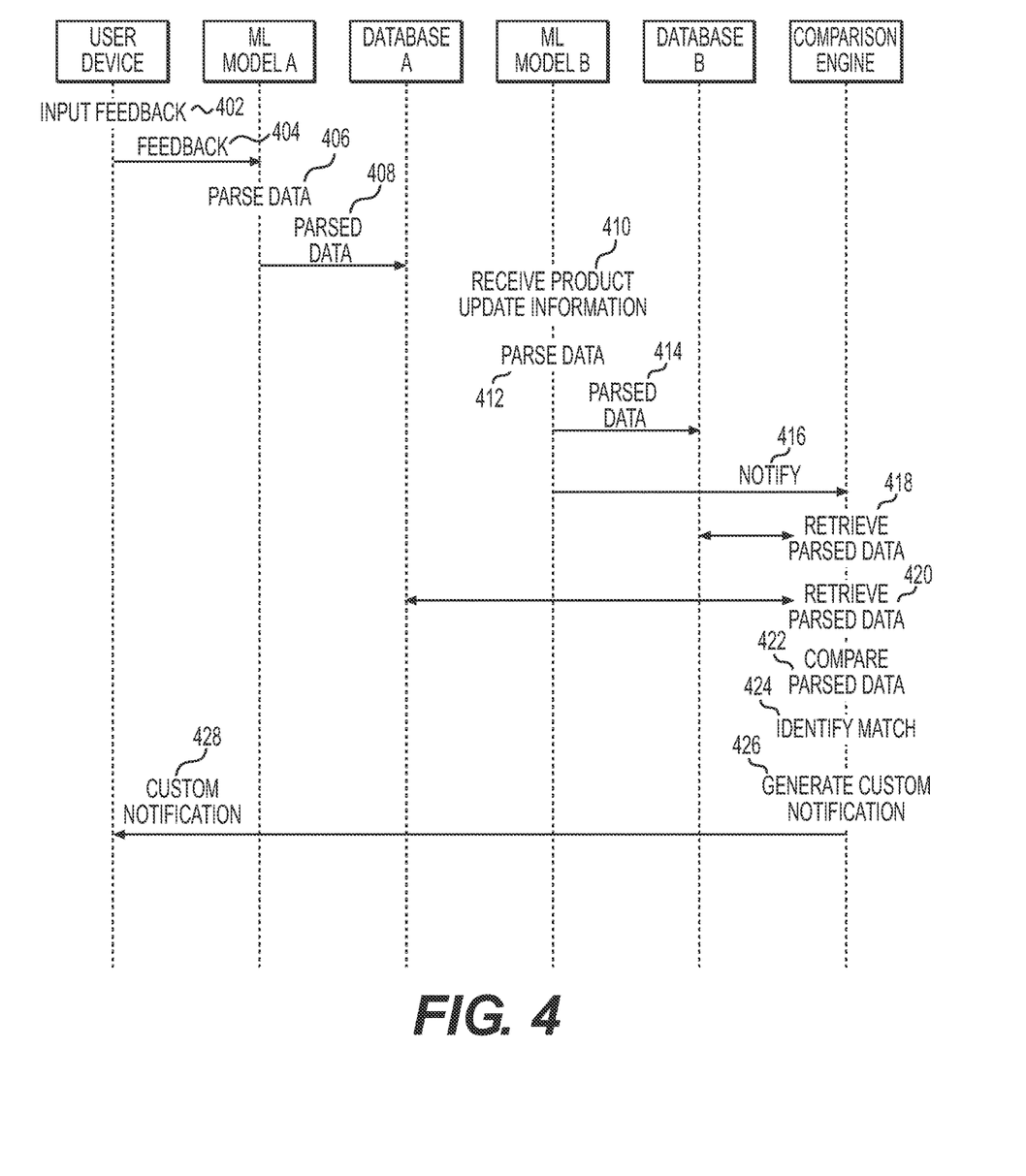
FIG. 4 is a sequence diagram of another example method for creating a customized response to user feedback.

FIG. 4 is a sequence diagram of an example method for creating a customized response to user feedback when receiving the product update information 130 triggers a comparison of the user feedback 120 and the product update information 130. At stage 402, the user device 110 can receive user feedback 120. The user feedback 120 can include feedback information from a user about the product, such as what the user likes or does not like about the product, recommend features or bug fixes, and the like. In an example, the user can provide the user feedback 120 from the user device 110 using a feedback tool associated with the product, such as a help section, an online forum, a survey, a help ticket, and the like.

At stage 404, the user device 110 can send the user feedback 120 to the ML model A 122. This can refer to the user device 110 sending the user feedback 120 to a computing device in the feedback system 100 that hosts the ML model A 122. At stage 406, the ML model A 122 can parse the user feedback 120. In an example, the ML model A 122 can parse the user feedback 120 by implementing one or more NLP techniques, such as classification predictive modeling, keyword extraction, and NER. For example, the ML model A 122 can identify keywords and phrases in the user feedback 120 and categorize them. In one example the ML model 122 can categorize the keywords by applying tags to them. In another example, the ML model A 122 can also recognize sentiments, such as whether the user feedback 120 is positive or negative. At stage 408, the parsed user feedback can be saved to the database A 124. For example, the feedback system 100 can save the parsed user feedback to the database A 124.

At stage 410, ML model B 132 can receive the product update information 130. The product update information 130 can include update information about the product, such as release notes or a POR. In an example, the product update information 130 can be provided by a project manager, or other type of user that manages releases of the product.

At stage 412, the ML model B 132 can parse the product update information 130. In an example, the ML model B 132 can parse the product update information 130 by implementing one or more NLP techniques. For example, the ML model B 132 can identify keywords and phrases in the product update information 130 and categorize them. In one example the ML model 122 can apply tags to the keywords and phrases to categorize them.

At stage 414, the parsed product update information can be saved to the database B 134. In an example, the parsed product update information can be accessed by the comparison engine 140 as needed. For example, the comparison engine 140 can access the parsed product update information after a user provides feedback about the product.

At stage 416, the comparison engine 140 can be notified about the parsed user feedback 120. For example, the computing device that applies the ML model B 132 to the product update information 120 can send the parsed results to the database B 134 and also notify the comparison engine 140. In another example, the database B 134 can notify the comparison engine 140 when parsed feedback results are saved.

In an example, the parsed product update information being saved to the database B 134 can trigger the comparison engine 140 to initiate a comparison of the user feedback 120 and product update information 130 to determine whether the product update addresses anything mentioned in any user feedback 120 submitted previously. At stage 418, the comparison engine 140 can retrieve the parsed product update information from the database B 134. In one example, the comparison engine 140 can query the database B 134 for the parsed product update information. In another example, the comparison engine 140 can have read access to the database B 134, and the comparison engine 140 can read the parsed data without downloading the data to another device. At stage 420, the comparison engine 140 can retrieve the parsed user feedback from the database A 124. This can occur in a manner similar to the parsed user product update information above.

At stage 422, the comparison engine 140 can compare the parsed user feedback to the parsed product update information. In one example, the comparison engine 140 can apply a word embedding algorithm to map keywords from the parsed user feedback and parsed product update information to a real-valued vector that indicates the meanings of the keywords. The comparison engine 140 can map the vectors of the keywords from the parsed user feedback to the keywords from the parsed product update information. In one example, the comparison engine 140 can compare keywords and phrases that are assigned to a like category, such as the same product feature.

At stage 424, the comparison engine 140 can identify a match from the comparison. For example, the feedback system 100 can match extracted keywords from the user feedback 120 to extracted keywords from the product update information 130. In one example, the feedback system 100 can match keywords when the keywords have been assigned to the same category. In another example, the feedback system 100 can semantically match keywords based on their contextual meaning using the word embedding techniques.

The match can also be predicated on timestamps between the product update information 130 and the user feedback 120 or whether the user feedback 120 has already been responded to. For example, if a product feature has already been the subject of multiple notifications to the user, then that feature may not trigger a match even though it can exist in both the product update information 130 and user feedback 120. Similarly, if more than a threshold amount of time has passed between the user feedback 120 and product update information 130, such as three years, then the system can send different messaging or decline the match altogether. For example, the system may still notify the user but use messaging that does not imply the update is connected to the user feedback.

At stage 426, the comparison engine 140 can generate a custom notification 150. In an example, the custom notification 150 can highlight portions of the product update information 130 that matched to customer feedback 120. The custom notification 150 can be created using any communication medium that can inform the user of the match, such as an email, instant message, or push notification. The custom notification 150 can be created in any format that draws a user's attention to the portions of the product update information 130 that matched to the user feedback 120.

At stage 428, the comparison engine 140 can send the custom notification 150 to the user device 110. This can allow the user to see that the user's feedback is being implemented into the product. In one example, the comparison engine 140 can send the custom notification 150 to an intermediary user, such as a product manager. The product manager can review the custom notification 150 for accuracy and modify the custom notification 150 if necessary. In one example where the comparison engine incorrectly matched a portion of the user feedback 120 to a portion of the product update information 130, the product manager can indicate the incorrect match. In one example, the product manager can also provide information indicating why the match is incorrect. The input from the product manager can be used to retrain the ML models A 122, B 132, and the comparison engine 140 so that a similar incorrect match can be avoided in the future. In an example, after reviewing the custom notification 150 and making any necessary changes, the product manager can send the custom notification to the user device 110.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for creating a customized response to user feedback about a product, the method comprising:
   training one or more machine-learning (ML) models to parse text and extract keywords or phrases from the text;
   upon receiving the user feedback, parsing the received user feedback using the trained one or more ML models to extract at least one of a keyword and a phrase from the parsed user feedback;
   upon receiving update information related to the product, parsing the received update information using the trained one or more ML models to extract at least one of a keyword and a phrase from the parsed update information;
   comparing the at least one of the keyword and the phrase from the parsed user feedback to the at least one of the keyword and the phrase from the parsed update information;
   determining, based on the comparing of the parsed user feedback and the parsed update information, that a portion of the received user feedback matches a portion of the received update information; and
   in response to the determining of the match, sending, to a user who provided the user feedback, a customized notification that identifies a relation between the received user feedback and the received update information.

2. The method of claim 1, wherein the parsed user feedback and parsed update information are compared semantically using a word embedding technique.

3. The method of claim 1, wherein the update information is at least one of a Plan of Record and Release Notes related to the product.

4. The method of claim 1, wherein the customized notification references the received user feedback and identifies the matching portion of the received update information.

5. The method of claim 1, further comprising:
   in response to receiving additional update information, comparing the at least one of the keyword and the phrase from the parsed user feedback to at least one of a keyword and a phrase extracted from the additional update information by using the trained one or more ML models, and then based on the comparing of the parsed user feedback and the additional update information, sending an additional customized notification to the user.

6. The method of claim 1, wherein the trained one or more ML models is a single ML model that performs the parsing of the received user feedback and the parsing of the received update information.

7. The method of claim 1, wherein the trained one or more ML models is a plurality of ML models including a first ML model and a second ML model, the parsing of the received user feedback being performed by the first ML model, and the parsing of the received update information being performed by the second ML model.

8. The method of claim 1, further comprising:
storing, in at least one database, the at least one of the keyword and the phrase from the received user feedback and the at least one of the keyword and the phrase from the received update information; and
before the comparing of the parsed user feedback and the parsed update information, retrieving, from the at least one database, the at least one of the keyword and the phrase from the received user feedback and the at least one of the keyword and the phrase from the received update information.

9. A non-transitory, computer-readable medium containing instructions that are executable by a hardware-based processor, wherein the instructions when executed cause the hardware-based processor to carry out a method for creating a customized response to user feedback about a product, and wherein the method comprises:
training one or more machine-learning (ML) models to parse text and extract keywords or phrases from the text;
upon receiving the user feedback, parsing the received user feedback using the trained one or more ML models to extract at least one of a keyword and a phrase from the parsed user feedback;
upon receiving update information related to the product, parsing the received update information using the trained one or more ML models to extract at least one of a keyword and a phrase from the parsed update information;
comparing the at least one of the keyword and the phrase from the parsed user feedback to the at least one of the keyword and the phrase from the parsed update information;
determining, based on the comparing of the parsed user feedback and the parsed update information, that a portion of the received user feedback matches a portion of the received update information; and
in response to the determining of the match, sending, to a user who provided the user feedback, a customized notification that identifies a relation between the received user feedback and the received update information.

10. The non-transitory, computer-readable medium of claim 9, wherein the parsed user feedback and parsed update information are compared semantically using a word embedding technique.

11. The non-transitory, computer-readable medium of claim 9, wherein the update information is at least one of a Plan of Record and Release Notes related to the product.

12. The non-transitory, computer-readable medium of claim 9, wherein the method further comprises:
in response to receiving additional update information, comparing the at least one of the keyword and the phrase from the parsed user feedback to at least one of a keyword and a phrase extracted from the additional update information by using the trained one or more ML models, and then based on the comparing of the parsed user feedback and the additional update information, sending an additional customized notification to the user.

13. The non-transitory, computer-readable medium of claim 9, wherein the customized notification references the received user feedback and identifies the matching portion of the received update information.

14. The non-transitory, computer-readable medium of claim 9, wherein the trained one or more ML models is a single ML model that performs the parsing of the received user feedback and the parsing of the received update information.

15. The non-transitory, computer-readable medium of claim 9, wherein the trained one or more ML models is a plurality of ML models including a first ML model and a second ML model, the parsing of the received user feedback being performed by the first ML model, and the parsing of the received update information being performed by the second ML model.

16. The non-transitory, computer-readable medium of claim 9, wherein the method further comprises:
storing, in at least one database, the at least one of the keyword and the phrase from the received user feedback and the at least one of the keyword and the phrase from the received update information; and
before the comparing of the parsed user feedback and the parsed update information, retrieving, from the at least one database, the at least one of the keyword and the phrase from the received user feedback and the at least one of the keyword and the phrase from the received update information.

17. A system comprising:
a computing device configured to execute instructions from memory using a hardware-based processor, to perform a method for creating a customized response to user feedback about a product, wherein the method comprises:
training one or more machine-learning (ML) models to parse text and extract keywords or phrases from the text;
upon receiving the user feedback, parsing the received user feedback using the trained one or more ML models to extract at least one of a keyword and a phrase from the parsed user feedback;
upon receiving update information related to the product, parsing the received update information using the trained one or more ML models to extract at least one of a keyword and a phrase from the parsed update information;
comparing the at least one of the keyword and the phrase from the parsed user feedback to the at least one of the keyword and the phrase from the parsed update information;
determining, based on the comparing of the parsed user feedback and the parsed update information, that a portion of the received user feedback matches a portion of the received update information; and
in response to the determining of the match, sending, to a user who provided the user feedback, a customized notification that identifies a relation between the received user feedback and the received update information.

18. The system of claim 17, wherein the parsed user feedback and parsed update information are compared semantically using a word embedding technique.

19. The system of claim 17, wherein the method further comprises:
- in response to receiving additional update information, comparing the at least one of the keyword and the phrase from the parsed user feedback to at least one of a keyword and a phrase extracted from the additional update information by using the trained one or more ML models, and then based on the comparing of the parsed user feedback and the additional update information, sending an additional customized notification to the user.

20. The system of claim 17, further comprising:
at least one database, wherein the method further comprises:
- storing, in the at least one database, the at least one of the keyword and the phrase from the received user feedback and the at least one of the keyword and the phrase from the received update information; and
- before the comparing of the parsed user feedback and the parsed update information, retrieving, from the at least one database, the at least one of the keyword and the phrase from the received user feedback and the at least one of the keyword and the phrase from the received update information.

\* \* \* \* \*